United States Patent
Grillo et al.

(10) Patent No.: US 9,874,244 B2
(45) Date of Patent: Jan. 23, 2018

(54) BEARING WITH INTEGRATED OIL DELIVERY SYSTEM

(71) Applicant: United Technologies Corporation, Hartford, CT (US)

(72) Inventors: Joseph Grillo, Bloomfield, CT (US); Kevin Duffy, Somers, CT (US); Ronnie K. Kovacik, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 365 days.

(21) Appl. No.: 14/621,986

(22) Filed: Feb. 13, 2015

(65) Prior Publication Data

US 2016/0356313 A1   Dec. 8, 2016

(51) Int. Cl.

| F16C 33/66 | (2006.01) |
|---|---|
| F16C 37/00 | (2006.01) |
| F16C 33/10 | (2006.01) |
| F16C 33/58 | (2006.01) |

(52) U.S. Cl.
CPC ...... *F16C 33/6659* (2013.01); *F16C 33/1045* (2013.01); *F16C 33/1065* (2013.01); *F16C 33/586* (2013.01); *F16C 33/6681* (2013.01); *F16C 37/007* (2013.01); *F16C 2360/23* (2013.01)

(58) Field of Classification Search
CPC .............. F16C 33/6659; F16C 33/1045; F16C 33/1065; F16C 33/586; F16C 33/6681; F16C 37/007
See application file for complete search history.

(56) References Cited

U.S. PATENT DOCUMENTS

| 2,040,803 | A | * | 5/1936 | Buckwalter | ............... | F16C 9/04 |
|---|---|---|---|---|---|---|
| | | | | | | 384/475 |
| 2,337,403 | A | * | 12/1943 | Myers | ................. | F16C 33/6607 |
| | | | | | | 384/473 |
| 3,195,965 | A | * | 7/1965 | Van Dorn | ........... | F16C 33/6662 |
| | | | | | | 384/475 |
| 3,836,215 | A | * | 9/1974 | Dopkin | ................. | F16C 27/045 |
| | | | | | | 384/99 |
| 5,114,248 | A | * | 5/1992 | Harsdorff | .............. | B60B 27/001 |
| | | | | | | 384/473 |

(Continued)

FOREIGN PATENT DOCUMENTS

| DE | 102005029075 | 12/2006 |
|---|---|---|
| DE | 102012206556 | 10/2013 |

(Continued)

OTHER PUBLICATIONS

Extended European Search Report dated Jun. 17, 2016 in European Application No. 15199822.6.

*Primary Examiner* — Thomas R Hannon
(74) *Attorney, Agent, or Firm* — Snell & Wilmer, L.L.P.

(57) ABSTRACT

An oil delivery system is provided. The system may comprise a bearing housing comprising an oil delivery cavity. A bearing may be pressed against the bearing housing. The bearing may comprise an outer ring with a passage formed through the outer ring. A bearing is also provided. The bearing may include an outer ring, and a passage formed through the outer ring.

17 Claims, 5 Drawing Sheets

(56) References Cited

U.S. PATENT DOCUMENTS

| | | | | |
|---|---|---|---|---|
| 5,720,559 | A * | 2/1998 | Mansson | F16C 32/064 384/398 |
| 6,325,546 | B1 * | 12/2001 | Storace | F01D 21/04 384/536 |
| 6,513,982 | B2 * | 2/2003 | Boyd | F16C 19/386 384/475 |
| 6,869,223 | B2 * | 3/2005 | Azumi | B23Q 1/70 384/466 |
| 7,214,037 | B2 * | 5/2007 | Mavrosakis | F01D 25/16 384/474 |
| 8,545,106 | B2 * | 10/2013 | Miller | F16C 33/6659 384/473 |
| 8,753,016 | B2 * | 6/2014 | Matsuyama | B23Q 11/122 384/471 |
| 8,794,841 | B2 * | 8/2014 | Schroder | F16C 33/6659 384/475 |
| 8,939,650 | B2 * | 1/2015 | Berruet | F16C 33/6659 384/475 |
| 8,979,384 | B2 * | 3/2015 | Onda | B23Q 11/123 384/475 |
| 9,523,389 | B2 * | 12/2016 | Schmidt | F16C 33/6659 |
| 2005/0281500 | A1 * | 12/2005 | Lin | F16C 33/60 384/475 |
| 2009/0129714 | A1 * | 5/2009 | Shimomura | F16C 19/26 384/475 |
| 2009/0175569 | A1 * | 7/2009 | Murata | F16C 33/4605 384/475 |
| 2013/0202432 | A1 | 8/2013 | House et al. | |
| 2015/0292562 | A1 | 10/2015 | Maeda | |
| 2015/0330251 | A1 * | 11/2015 | Hanrahan | F01D 25/162 415/1 |
| 2016/0160924 | A1 * | 6/2016 | Meyers | F01D 25/164 384/474 |
| 2016/0281779 | A1 * | 9/2016 | Saadi | F01D 25/16 |

FOREIGN PATENT DOCUMENTS

| | | |
|---|---|---|
| EP | 2078877 | 7/2009 |
| EP | 2574805 | 4/2013 |
| JP | 2010156383 | 7/2010 |
| WO | 2014069109 | 5/2014 |

* cited by examiner

BEARING WITH INTEGRATED OIL DELIVERY SYSTEM

GOVERNMENT LICENSE RIGHTS

This disclosure was made with government support under contract No. W911W6-08-2-0001 awarded by the United States Army, proposal number P00021. The government has certain rights in the disclosure.

FIELD OF INVENTION

The present disclosure relates to engines bearing compartments, and, more specifically, to an oil delivery system for a bearing compartment.

BACKGROUND

Turbine engines typically rely on bearings to enable relative rotation between static and rotary engine components. Bearings are housed in bearing compartments which may use carbon seals to prevent oil from leaking out of the compartment. Carbon seals may generate heat due to sliding contact between the rotating metal runner and static carbon. To maintain acceptable bearing compartment temperature cooling oil is often introduced to the rotating metal part of the seal. Oil is typically jetted directly at the seal or fed to the seal through passages in the rotating hardware. Oil is typically fed into the compartment through an oil jet, which may be integral to the compartment housing or an independent part.

SUMMARY

An oil delivery system may comprise a bearing housing comprising an oil delivery cavity. A bearing may be pressed against the bearing housing. The bearing may comprise an outer ring with a passage formed through the outer ring.

In various embodiments, the passage may be aligned with the oil delivery cavity. The passage may be configured to deliver oil to a surface opposite the passage at an angle between 0 degrees and 90 degrees. A clocking mechanism may align the passage and the oil delivery cavity. The passage may further comprise an inlet formed in the outer ring. The passage may also comprise a first passage formed into a spot face of the inlet and in the outer ring. The passage may further comprise a nozzle passage formed through the first passage and in the outer ring. A portion of the outer ring may be bored to create a surface defining an outlet of the nozzle passage. The oil delivery cavity may comprise a buffer plenum. The buffer plenum may comprise a cylindrical geometry.

A bearing may comprise an outer ring, and a passage formed through the outer ring.

In various embodiments, the outer ring further comprises a clocking mechanism configured to align the outer ring in response to installation. The passage may comprise an inlet formed in the outer ring, a first passage formed into a spot face of the inlet and in the outer ring, and a nozzle passage formed through the first passage and in the outer ring. A portion of the outer ring may be bored to create a surface defining an outlet of the nozzle passage.

A bearing outer ring may comprise a cylindrical body formed from a hard material, and a passage formed through the cylindrical body.

In various embodiments, the cylindrical body may also include a clocking mechanism configured to align the cylindrical body in response to installation. The passage further may further comprise a nozzle passage formed in the cylindrical body. A portion of the cylindrical body may be bored to create a surface defining an outlet of the nozzle passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
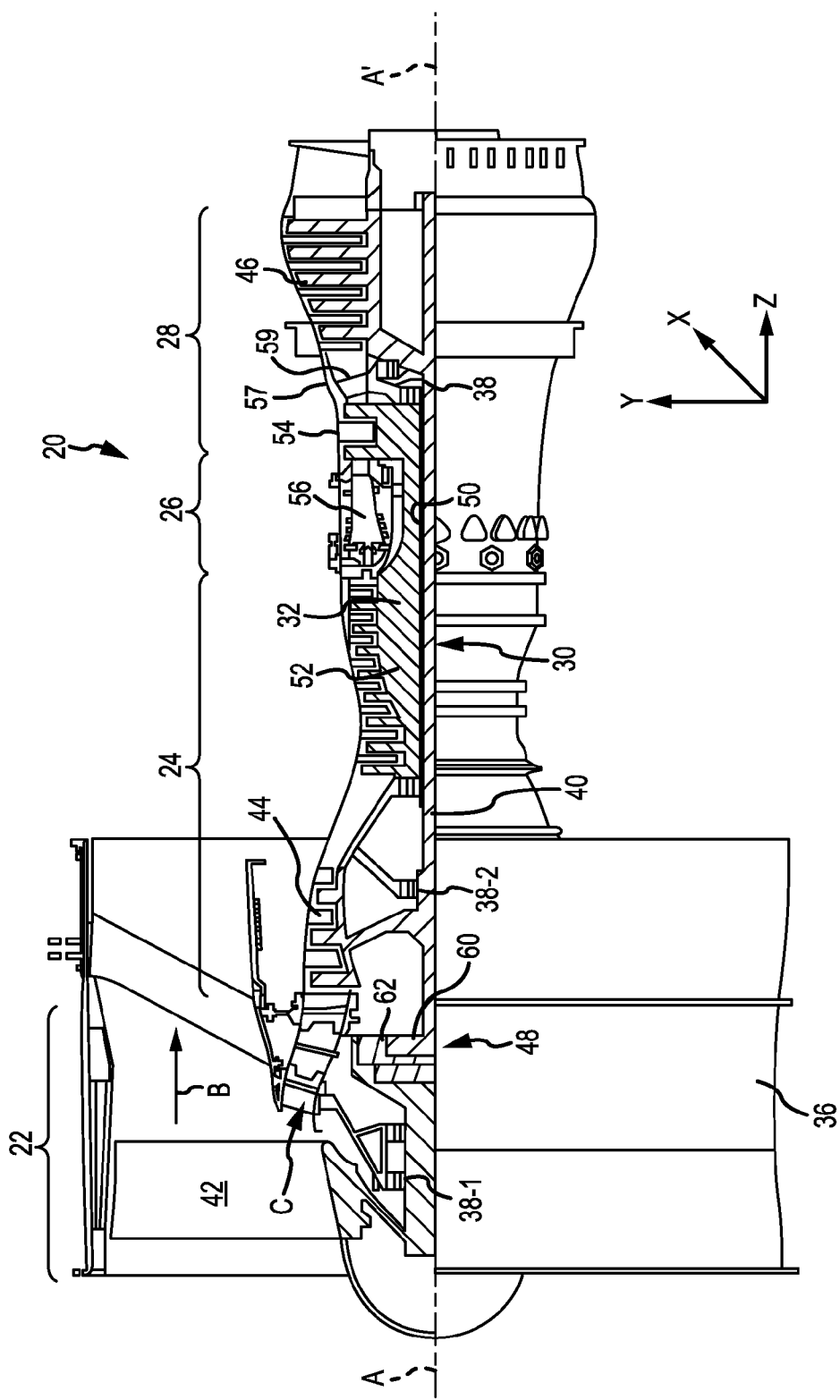
FIG. 1 illustrates a cross sectional view of an exemplary gas turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2. In various embodiments, bearing system 38, bearing system 38-1, and bearing system 38-2 may be contained within a bearing housing and/or integrated into an oil delivery system, as described in further detail below.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor 52 and high pressure (or second) turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle.

It should be understood that the above parameters are exemplary of various embodiments of a suitable geared architecture engine and that the present disclosure contemplates other turbine engines including direct drive turbofans, power generators, auxiliary power units, turboshaft engines (e.g., helicopter turbine engines), and/or any other type of turbine engine utilizing bearings.

Figure 2:
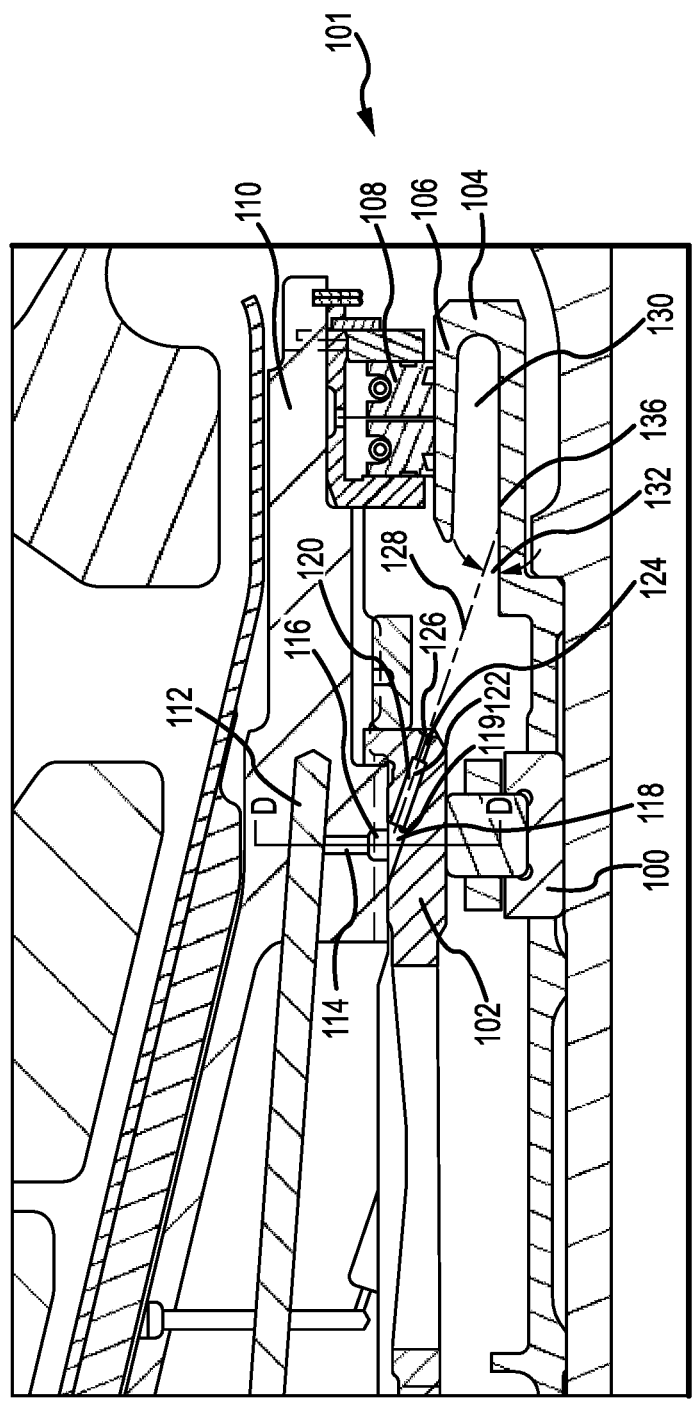
FIG. 2 illustrates a cross sectional view of a bearing compartment with an oil delivery system integrated into a bearing, in accordance with various embodiments.

With reference to FIG. 2, a bearing chamber 101 is shown, in accordance with various embodiments. Bearing chamber 101 contains bearing 100 with outer ring 102 pressed against bearing housing 110. Outer ring 102 may comprise a cylindrical body made from a hard material (e.g., bearing steel such at the stainless steel alloy commercially available under the trademark Lescalloy® M50). Seal ring 104 extends axially from bearing 100. Annular member 106 extends from seal ring 104 and seal ring 104 defines cavity 130. During operation, carbon component 108 may slideably engage annular member 106 and generate heat. Bearing housing 110 may support carbon component 108 as well as bearing 100. Bearing housing may also contain oil delivery cavity 112. Oil delivery cavity 112 may deliver oil to one or more locations in bearing chamber 101. Oil delivery cavity 112 may comprise an outlet 114 and a buffer plenum 116. Oil delivery cavity 112, outlet 114, and buffer plenum 116 may each be at least partially defined by bearing housing 110.

In various embodiments, passage 120 passes through bearing 100 and is defined by outer ring 102 of bearing 100. Inlet 118 of passage 120 may be fluidly coupled to buffer plenum 116. Outer ring 102 and bearing housing 110 may press together tightly so that a natural seal is formed between outer ring 102 and bearing housing 110. Inlet 118 may also be defined by bearing 100 and more specifically by outer ring 102 of bearing 100. A spot face 119 is formed at a boundary of inlet 118, which is formed in an outer diameter of outer ring 102. A passage 122 of passage 120 may be drilled into outer ring 102 and may extend perpendicular to spot face 119. A nozzle passage 124 may be formed extending away from passage 122 by drilling into outer ring 102 through passage 122. In that regard, nozzle passage 124 may extend in substantially the same direction as passage 122.

Nozzle passage 124 may be formed with an outlet in a sidewall of outer ring 102. Passage 122 may have a larger hydraulic diameter than nozzle passage 124. A portion of outer ring 102 marking an end of nozzle passage 124 may be back drilled with a larger diameter and/or hydraulic diameter to create surface 126 defining the outlet of nozzle passage 124 to prevent brooming of oil jet and/or spray ejected from nozzle passage 124.

In various embodiments, oil jet 128 may eject from nozzle passage 124 at surface 126 and spray towards cavity 130. The angle 132 between seal ring surface 136 and oil jet 128 may be between 0 and 90 degrees. The angle 132 between seal ring surface 136 and oil jet 128 may also be between 0 and 90 degrees. Oil delivered to cavity 130 may cool seal ring 104 and annular member 106. Passage 120 formed integrally with bearing 100 may eliminate additional, separate nozzle from an oil delivery system and thus reduce system weight and volume. Additionally, passage 120 integrated into bearing 100 may be deployed closer to seal ring surface 136 than if an additional nozzle were used. In that regard, passage 120 may operate in smaller bearing compartments.

Figure 3:
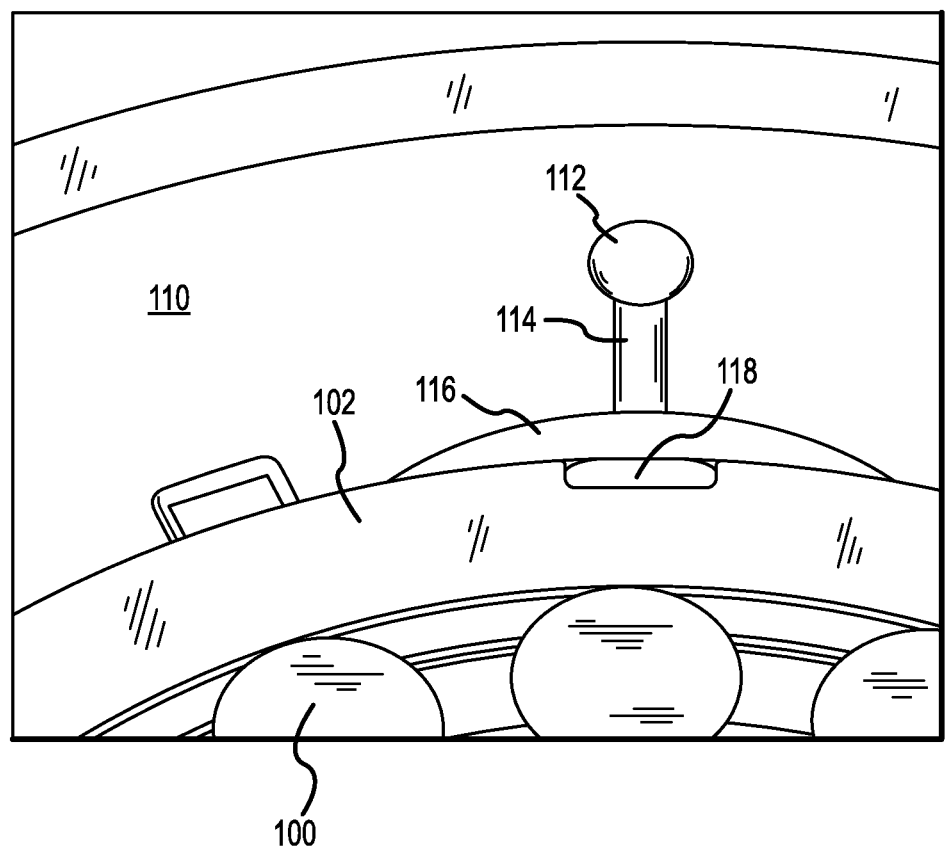
FIG. 3 illustrates a cross sectional view of an oil delivery system integrated into a bearing, in accordance with various embodiments.

With reference to FIG. 3, a cross-sectional view of bearing 100 and bearing housing 110 is shown along line D-D of FIG. 2, in accordance with various embodiments. Outer ring 102 fits against bearing housing 110 to provide a sealing effect. Oil delivery cavity 112 delivers oil to outlet 114. Outlet 114 delivers oil into buffer plenum 116. Buffer plenum 116 may have a partial cylindrical geometry, for example, to ensure that oil may pass from buffer plenum 116 to inlet 118. In that regard, inlet 118 and buffer passage may at least partially align to provide an oil flow path.

Figure 4:
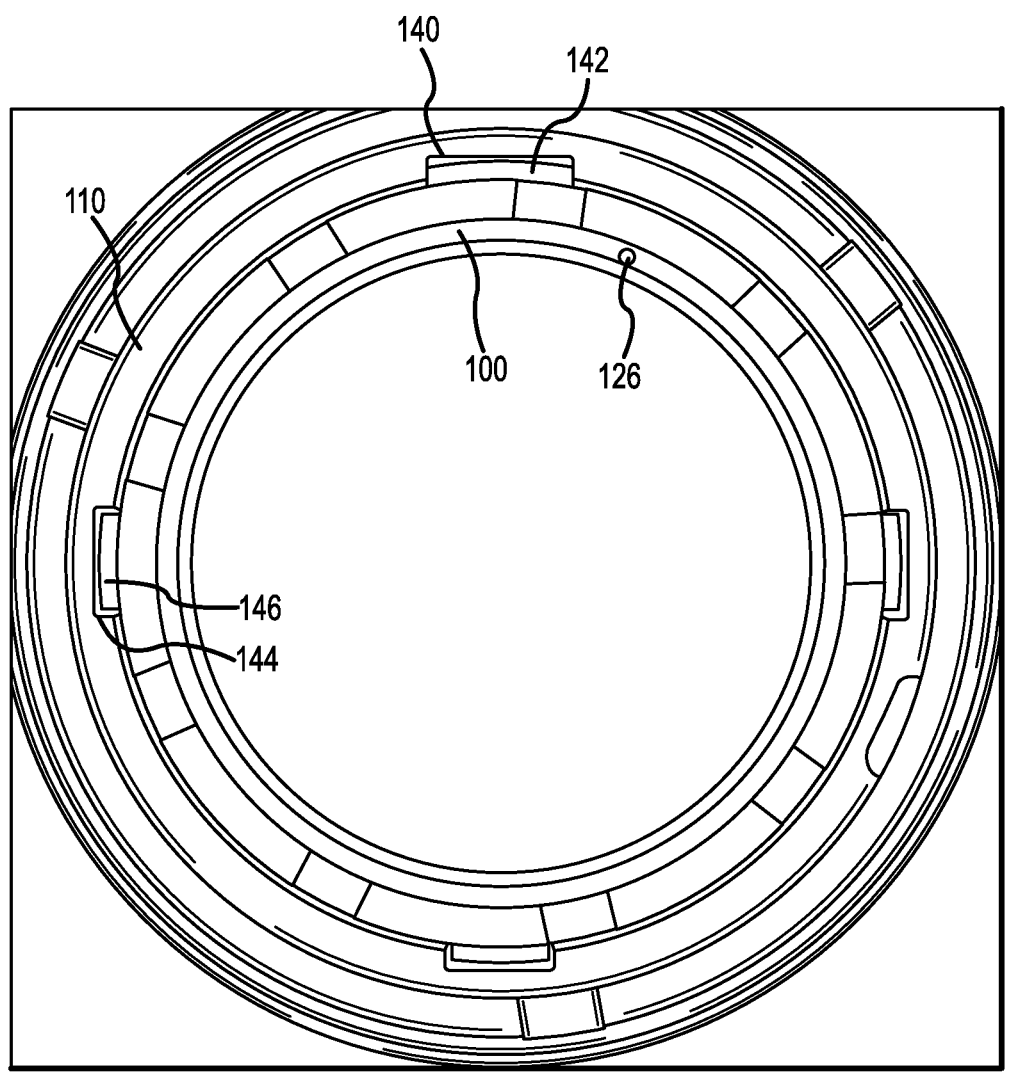
FIG. 4 illustrates a clocking mechanism for a bearing with an integrated oil delivery system, in accordance with various embodiments.

In various embodiments, and with reference to FIG. 4, a bearing 100 is shown mated with a bearing housing 110. Bearing housing 110 may comprise small grooves 144 and large groove 140. A large tab 142 may extend from bearing 100 and fit into large groove 140. Similarly, small tabs 146 may extend from bearing 100 and fit into small grooves 144. The tab-in-groove interface between bearing 100 and bearing housing 110 is one example of a clocking mechanism to ensure that passages internal to outer ring 102 of bearing 100 and bearing housing 110 (as illustrated in FIGS. 2 and 3) align within tolerances and enable oil flow from bearing housing 110 into bearing 100. In response to bearing 100 is installed, the tabs and grooves align outer ring 102 with bearing housing 110 and thus align internal oil cavities. In various embodiments, large tab 142 and small tabs 146 may both extend from outer ring 102 of bearing 100 to align outer ring 102 with bearing housing 110.

Figure 5:
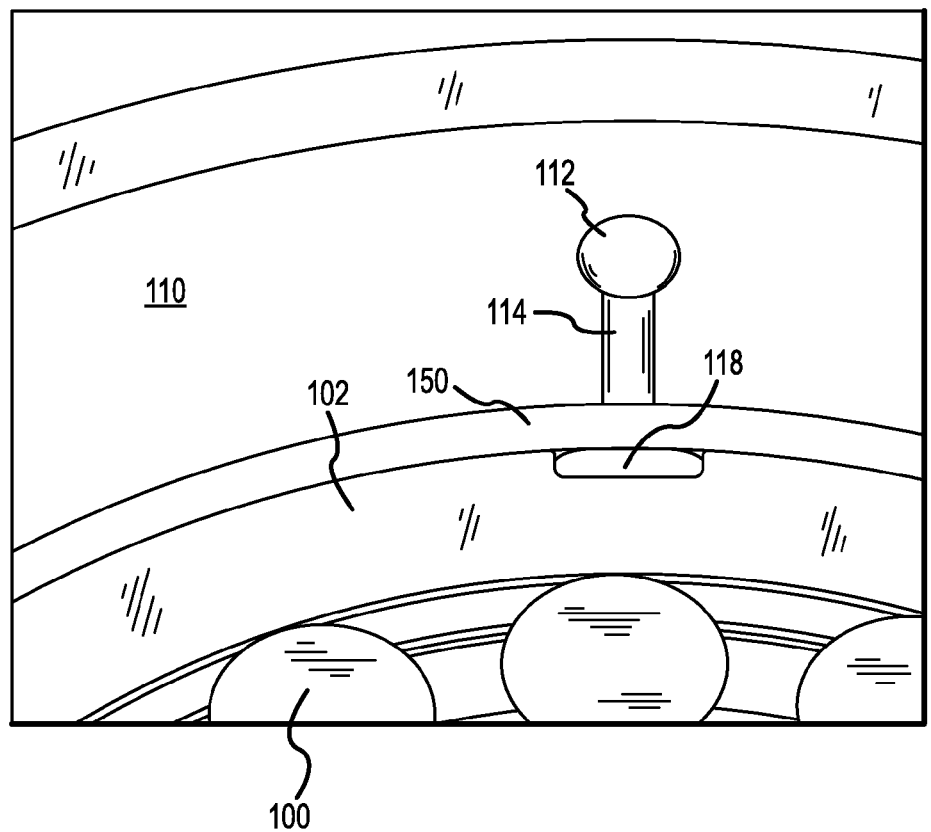
FIG. 5 illustrates a cross sectional view of an oil delivery system integrated into a bearing with an annular buffer plenum, in accordance with various embodiments.

With reference to FIG. 5, a cross-sectional view of bearing 100 and bearing housing 110 is shown, in accordance with various embodiments. Outer ring 102 fits against bearing housing 110 to provide a sealing effect. Oil delivery cavity 112 delivers oil to outlet 114. Outlet 114 delivers oil into annular buffer plenum 150. Annular buffer plenum 150 may have a cylindrical geometry and extend about the outer diameter of outer ring 102, for example, to ensure that oil may pass from annular buffer plenum 150 to inlet 118. Annular buffer plenum 150 may fill with oil and automatically deliver oil to inlet 118 in fluid communication with annular buffer plenum 150. In that regard, inlet 118 and annular buffer passage 150 may deliver oil to outer ring 102 and inlet 118 without a clocking mechanism to align outer ring 102 (e.g., the clocking mechanism of FIG. 4 may be omitted).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An oil delivery system, comprising:
   a bearing housing comprising an oil delivery cavity;
   a bearing comprising an outer ring contacting the bearing housing, the outer ring comprising at least one tab configured to align the outer ring with the bearing housing; and
   a passage formed through the outer ring.

2. The oil delivery system of claim 1, wherein the passage is aligned with the oil delivery cavity.

3. The oil delivery system of claim 1, wherein the bearing housing has at least one groove and the bearing has at least one tab, wherein the tab fits into the groove aligning the passage and the oil delivery cavity.

4. The oil delivery system of claim 1, wherein the passage further comprises an inlet formed in the outer ring.

5. The oil delivery system of claim 4, wherein the passage further comprises a first passage formed into a spot face of the inlet and in the outer ring.

6. The oil delivery system of claim 5, wherein the passage further comprises a nozzle passage formed through the first passage and in the outer ring.

7. The oil delivery system of claim 6, wherein a portion of the outer ring is bored to create a surface defining an outlet of the nozzle passage.

8. The oil delivery system of claim 1, wherein the oil delivery cavity comprises a buffer plenum.

9. The oil delivery system of claim 8, wherein the buffer plenum comprises a cylindrical geometry.

10. A bearing, comprising:
   an outer ring comprising a cylindrical body having an outer diameter and a sidewall adjacent the outer diameter, wherein the outer ring further comprises at least one tab configured to align the outer ring in response to installation; and
   a passage formed through the outer ring, the passage extending from the outer diameter to the sidewall and directed away from the bearing.

11. The bearing of claim 10, wherein the passage further comprises an inlet formed in the outer ring.

12. The bearing of claim 11, wherein the passage further comprises a first passage formed into a spot face of the inlet and in the outer ring.

13. The bearing of claim 12, wherein the passage further comprises a nozzle passage formed through the first passage and in the outer ring.

14. The bearing of claim 13, wherein a portion of the outer ring is bored to create a surface defining an outlet of the nozzle passage.

15. A bearing outer ring, comprising:
   a cylindrical body comprising an outer diameter, a sidewall adjacent the outer diameter, and at least one tab configured to align the cylindrical body in response to installation; and
   a passage formed through the cylindrical body, the passage extending from the outer diameter to the sidewall.

16. The bearing outer ring of claim 15, wherein the passage further comprises a nozzle passage formed in the cylindrical body.

17. The bearing outer ring of claim 16, wherein a portion of the cylindrical body is bored to create a surface defining an outlet of the nozzle passage.

* * * * *